H. S. DICKINSON.
LISTER PLANTER.
APPLICATION FILED JULY 10, 1919.

1,319,854.

Patented Oct. 28, 1919.
2 SHEETS—SHEET 1.

INVENTOR.
H. S. Dickinson
BY
Rogen, Kennedy Campbell
ATTORNEYS.

H. S. DICKINSON.
LISTER PLANTER.
APPLICATION FILED JULY 10, 1919.

1,319,854.

Patented Oct. 28, 1919.
2 SHEETS—SHEET 2.

INVENTOR.
H. S. Dickinson
BY
Rogers, Kennedy Campbell
ATTORNEYS

UNITED STATES PATENT OFFICE.

HARRY S. DICKINSON, OF MOLINE, ILLINOIS, ASSIGNOR TO MOLINE PLOW COMPANY, A CORPORATION OF ILLINOIS.

LISTER-PLANTER.

1,319,854.   Specification of Letters Patent.   Patented Oct. 28, 1919.

Original application filed March 23, 1918, Serial No. 224,133. Divided and this application filed July 10, 1919. Serial No. 309,842.

*To all whom it may concern:*

Be it known that I, HARRY S. DICKINSON, a citizen of the United States, residing at Moline, in the county of Rock Island and State of Illinois, have invented certain new and useful Improvements in Lister-Planters, of which the following is a specification, reference being had therein to the accompanying drawing, being a division of original application filed March 23, 1918, Serial No. 224,133.

This invention relates to seed planting machines, and has reference more particularly to the type of planter in which the seed discharging mechanism is driven from one of the ground wheels by intermediate driving gearing, and in which the ground wheels are movable up and down relatively to the seeding mechansm, and the invention consists of the improved form of driving connection between the ground wheel and seeding mechanism, by means of which the rotation of the ground wheel will be transmitted to the seed discharging mechanism without regard to the change in distance between the two, due to the up-and-down movements of the ground wheels.

In the accompanying drawings, I have shown my invention applied in connection with a form of lister planter in which a plow beam carrying a furrow opener, is supported for up and down movement by a frame, supported in turn by ground wheels which are adjustable alternately up and down relative to the frame and in unison with the beam, as set forth and claimed in an application for Letters Patent filed by me on the 23rd day of March 1918, Serial No. 224,133, of which the present application is a division. It will be manifest, however, that the present invention is not confined in its application to a machine of this particular type and construction, but is applicable as well to other forms of seed planters wherein there is a relative bodily movement between the seed discharging mechanism and the ground wheel which drives the same.

Figure 1:
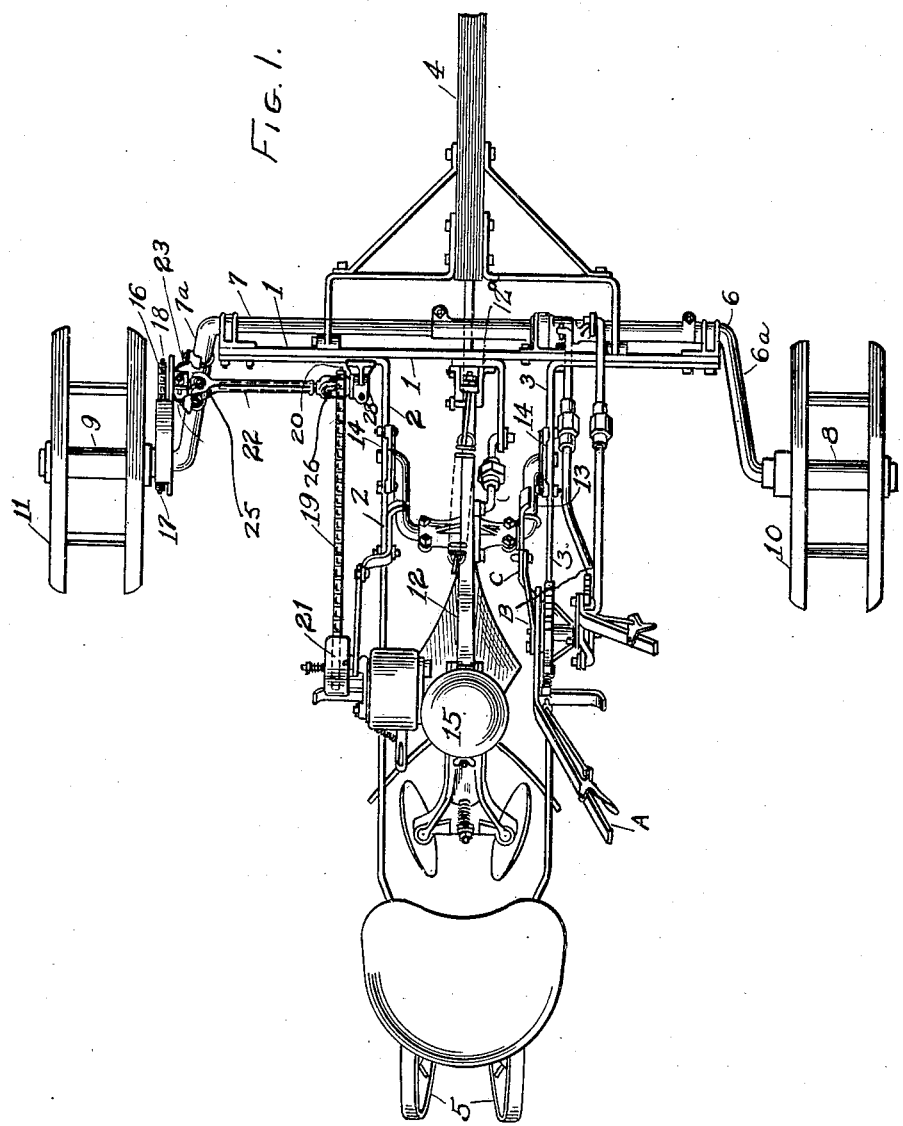
Figure 1 is a top plan view of a lister planter having my invention embodied therein.
Figure 2:
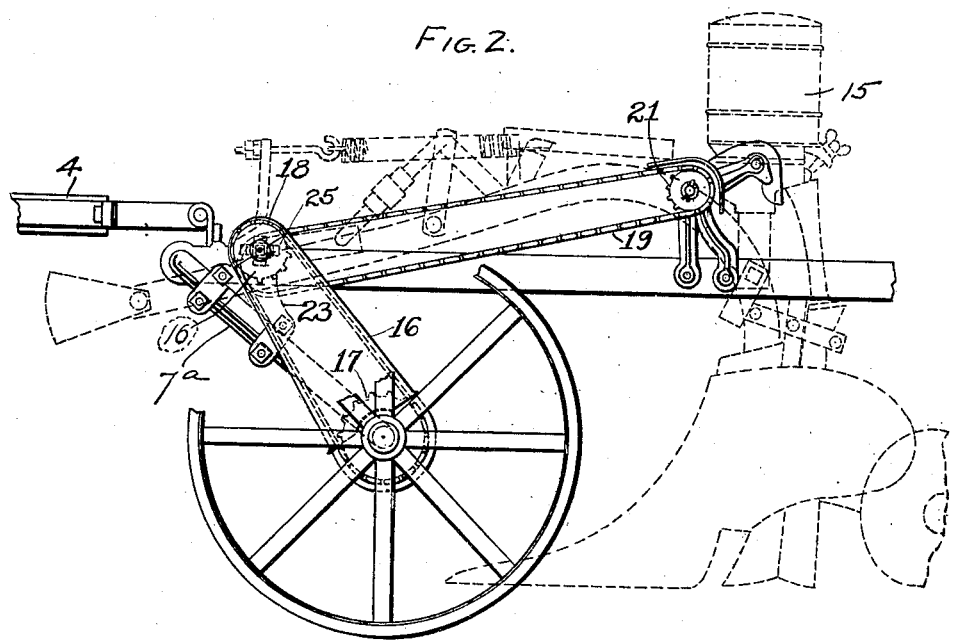
Fig. 2 is a side elevation of the same.
Figure 3:
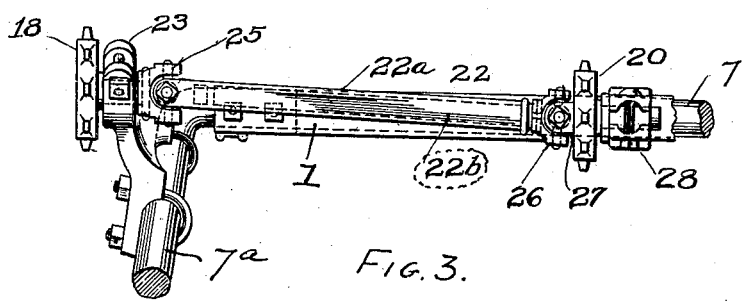
Fig. 3 is a rear elevation of one of the wheel axles and its connected crank arm, and the parts of the driving mechanism sustained thereby.

Referring to the drawings:

The frame of the machine comprises in the present instance, a front frame bar 1 and two rearwardly extending frame bars 2 and 3 connected fixedly at their forward ends to the front frame bar, a draft tongue 4 being connected to the front of the frame, and covering wheels 5 being connected with the rear of the frame in longitudinal alinement with the center of the same.

Mounted on the frame in transverse alinement with each other, are two wheel axles 6 and 7, the outer ends of which are formed with crank arms $6^a$ and $7^a$ provided with ground wheel supports in the form of wheel spindles 8 and 9, ground wheels 10 and 11 being rotatably mounted on said spindles and being spaced apart equal distances from the longitudinal center of the machine and giving support to the frame. 12 designates a centrally arranged fore and aft extending plow beam, provided, in the present instance, with a furrow opener in the form of a double moldboard plow. The beam is pivoted to a swinging bail 13 journaled at its ends in bearings 14, 14, fixed to the respective longitudinal frame bars, the construction being such that by swinging the bail up and down, the beam will be correspondingly raised and lowered and the plow elevated out of and lowered into action, the level of the beam in these movements being maintained by means of a link $12^a$ pivoted at its rear end to an upward extension of the beam and pivoted at its front end to a bracket arm 12 on the machine frame.

The two axles are adapted to be rocked in their bearings to move the ground wheels up and down alternately and in unison with the plow beam, by means of a hand lever A and devices B and C connecting said lever with the axles and with the beam, and as said lever and connecting devices in themselves form no part of the present invention, and as their construction and mode of operation are fully set forth in my said application above referred to, reference may be had to said application for a fuller description than is herein given.

A seed discharging mechanism 15 is sustained by the frame of the machine so that in the advance of the machine the seed will be deposited in the furrow formed by the furrow opener. This seed discharging mechanism is driven from the ground wheel 11 through a train of gearing comprising a sprocket chain 16 passing around a sprocket wheel 17 and a sprocket wheel 18; a sprocket chain 19 passing around a sprocket wheel 20 and a sprocket wheel 21; and a driving element 22 operatively connected with the hub of the sprocket wheel 18 and with the hub of the sprocket wheel 20. The sprocket wheel 17 is carried by the hub of the ground wheel, and the hub of the sprocket wheel 18 is journaled for rotation in a bearing 23 clipped to the axle arm 7$^a$ of the axle 7 near the upper end of said arm.

The driving element 22 is in the form of a hollow member or tube 22$^a$ and a shaft 22$^b$ telescoping in the tube, the opening in the tube and the shaft being of angular form in cross-section so that the rotary motion imparted to one will be transmitted to the other, and they will be allowed to move relatively to each other in an endwise direction, for the purpose presently to be described. The outer end of the tube is connected by a gimbal or universal joint 25 with the hub of the sprocket wheel 18 at the inner side of the bearing of said hub, while the inner end of the shaft is connected by a gimbal or universal joint 26 with the outer end of a hub 27 on the sprocket wheel 20, the inner end of said hub being mounted in a journal bearing 28 fixed to the front member 1 of the machine frame. The sprocket wheel 21 is operatively connected with the seed discharging mechanism 15 to operate the same.

By means of the driving gearing above described, the seed discharging mechanism is operated by the rotation of the ground wheel 11, the rotary motion of said wheel imparting rotary motion to the driving element 22 by means of the sprocket chain 16, which motion is transmitted to the seed discharging mechanism by the sprocket chain 19, the connection of the driving element with the hubs of the wheels 18 and 20 by the gimbal joints, and the capability of the parts of the driving element to move endwise relatively to each other, permitting the sprocket wheel 18 on the axle arm, to move up and down relatively to the sprocket wheel 20 in the up and down movements of the ground wheel, without disturbing or interfering with the operation of the parts in transmitting the rotary motion of the ground wheel to the seed discharging mechanism.

In the foregoing description and accompanying drawings, I have set forth my invention in the particular detailed form and construction which I prefer to adopt, but it will be manifest that the invention is not limited to the particular details and embodiment shown as they may be variously changed without departing from the spirit of the invention. Further, it will be understood that the invention is not limited to any particular form or construction of the parts, except in so far as such limitations are specified in the claims.

Having thus described my invention, what I claim is:

1. In a seeding machine, the combination of a frame, wheel supports mounted on the frame and movable up and down relatively thereto, ground wheels rotatable on said supports, a seed discharging mechanism sustained by the machine and in relation to which the wheel supports are movable, and driving connections between one of the ground wheels and the seed discharging mechanism, said connections including a driving sprocket wheel rotatably mounted on the wheel support and movable therewith and driven from the ground wheel, a driven sprocket wheel rotatable on the frame and geared to the seed discharging mechanism, a driving element, a gimbal joint connecting the driving element with the driving sprocket wheel, and a second gimbal connecting the driving element with the driven sprocket wheel.

2. In a seeding machine, the combination of a frame, wheel supports mounted on the frame and movable up and down relatively thereto, ground wheels rotatable on said supports, a seed discharging mechanism sustained by the machine and in relation to which the wheel supports are movable, and driving connections between one of the ground wheels and said seed discharging mechanism, said connections including a driving sprocket wheel rotatable on the wheel support and driven from the ground wheel, a driven sprocket wheel rotatable on the frame and geared to the seed discharging mechanism, a telescopic driving element, a gimbal joint connecting the driving element with the driving sprocket wheel, and a second gimbal joint connecting the driving element with the driven sprocket wheel.

3. In a seeding machine, the combination of a frame, wheel supports mounted on the frame and movable up and down relatively thereto, ground wheels rotatable on the supports, a seed discharging mechanism sustained by the machine and in relation to which the wheel supports are movable, and driving connections between one of the ground wheels and the seed discharging mechanism, said driving connections comprising a sprocket wheel rotatable about the axis of the ground wheel and operated thereby, a second sprocket wheel rotatable on and movable with the wheel support at a point removed from the first sprocket wheel, a sprocket chain passing around said sprocket wheels, a third sprocket wheel rotatable on the machine frame, a driving element intermediate the second and third sprocket wheels, gimbal joints connecting the two ends of the driving element respectively with the second and third sprocket wheels, and driving connections between the third sprocket wheel and the seed discharging mechanism.

4. In a seeding machine, the combination of a frame, wheel supports mounted on the frame and movable up and down relatively thereto, ground wheels mounted on the wheel supports, a seed discharging mechanism sustained by the machine and in relation to which the wheel supports are movable up and down, and driving connections between one of the ground wheels and the seed discharging mechanism, said driving connections comprising a sprocket wheel rotatable about the axis of the ground wheel and operated thereby, a second sprocket wheel rotatable on and movable up and down with the wheel support and distant from the first mentioned sprocket, a sprocket chain passing around said sprocket wheels, a third sprocket wheel rotatably mounted on the machine frame, a driving element between the second and third sprocket wheels, a fourth sprocket wheel operatively connected with the seed discharging mechanism to actuate it, and a sprocket chain passing around the said third and fourth sprocket wheels.

5. In a seeding machine, the combination of a frame, wheel supports mounted thereon and movable up and down relatively thereto, ground wheels rotatable on said supports, a seed discharging mechanism sustained by the machine and in relation to which the wheel supports are movable, a driving sprocket wheel mounted on and movable with one of the wheel supports and driven from the ground wheel on said support, a driven sprocket wheel rotatably mounted on the machine frame, a transversely extending driving element operatively connected at its outer end with the driving sprocket wheel and operatively connected at its inner end with the driven sprocket wheel, a sprocket wheel operatively connected with the seed discharging mechanism, and a sprocket chain passing around the last mentioned sprocket wheel and around the driven sprocket wheel and extending in a fore and aft direction between said wheels.

6. In a seeding machine, the combination of a frame, wheel supports mounted on the front of the frame and movable up and down relatively thereto, ground wheels rotatable on said supports, a seed discharging mechanism sustained by the machine in the rear of the wheel supports and in relation to which the wheel supports are movable, a sprocket wheel rotatable with one of the ground wheels about the axis of the same, a second sprocket wheel rotatably mounted in a bearing carried by the wheel support and distant from the first sprocket, a sprocket chain passing around said sprocket wheels, a third sprocket wheel rotatably mounted in a bearing sustained by the machine frame at its front, a telescopic driving element extending transversely between said second and third sprocket wheels, gimbal joints connecting the ends of said driving element with the second and third sprocket wheels respectively, a fourth sprocket wheel operatively connected with the seed discharging mechanism to actuate the same, and a fore and aft extending sprocket chain passing around said third and fourth sprocket wheels.

In testimony whereof I have affixed my signature hereto.

HARRY S. DICKINSON.

Copies of this patent may be obtained for five cents each, by addressing the "Commissioner of Patents. Washington, D. C."